United States Patent [19]
Gehring

[11] Patent Number: 4,774,515
[45] Date of Patent: Sep. 27, 1988

[54] ATTITUDE INDICATOR

[76] Inventor: Bo Gehring, 189 Madison Avenue, Toronto, Ontario, Canada, M5R2S6

[21] Appl. No.: 781,388

[22] Filed: Sep. 27, 1985

[51] Int. Cl.[4] .............................................. G01S 13/58
[52] U.S. Cl. ....................................................... 342/53
[58] Field of Search ................ 343/6 R, 6 DF, 6 ND, 343/5 MM, 5 CM; 342/427, 147, 192, 24, 27, 28; 367/126

[56] References Cited

U.S. PATENT DOCUMENTS

| | | | |
|---|---|---|---|
| 3,076,961 | 2/1963 | Bibbero | 343/6 ND |
| 3,172,075 | 3/1965 | Kay | 367/102 |
| 3,185,980 | 5/1965 | Gustafson et al. | 342/52 |
| 3,366,922 | 1/1968 | Kay | 367/102 |
| 3,940,769 | 2/1976 | Sherman et al. | 342/427 |
| 3,952,300 | 4/1976 | Campbell | 343/6 R |
| 4,347,511 | 8/1982 | Hofmann et al. | 343/5 MM X |
| 4,495,580 | 1/1985 | Keearns | 343/5 MM X |
| 4,514,733 | 4/1985 | Schmidtlein et al. | 343/5 MM |
| 4,584,646 | 4/1986 | Chan et al. | 343/5 MM X |

Primary Examiner—Thomas H. Tarcza
Assistant Examiner—John B. Sotomayor
Attorney, Agent, or Firm—Nilsson, Robbins, Dalgarn, Berliner, Carson & Wurst

[57] ABSTRACT

This invention relates to providing aural indications to a person indicative of that person's environment and, more particularly, to providing such indications in three-dimensional form. More specifically, this invention relates to providing such three-dimensional aural indications to an individual to provide aural attitude information useful to that individual.

16 Claims, 3 Drawing Sheets

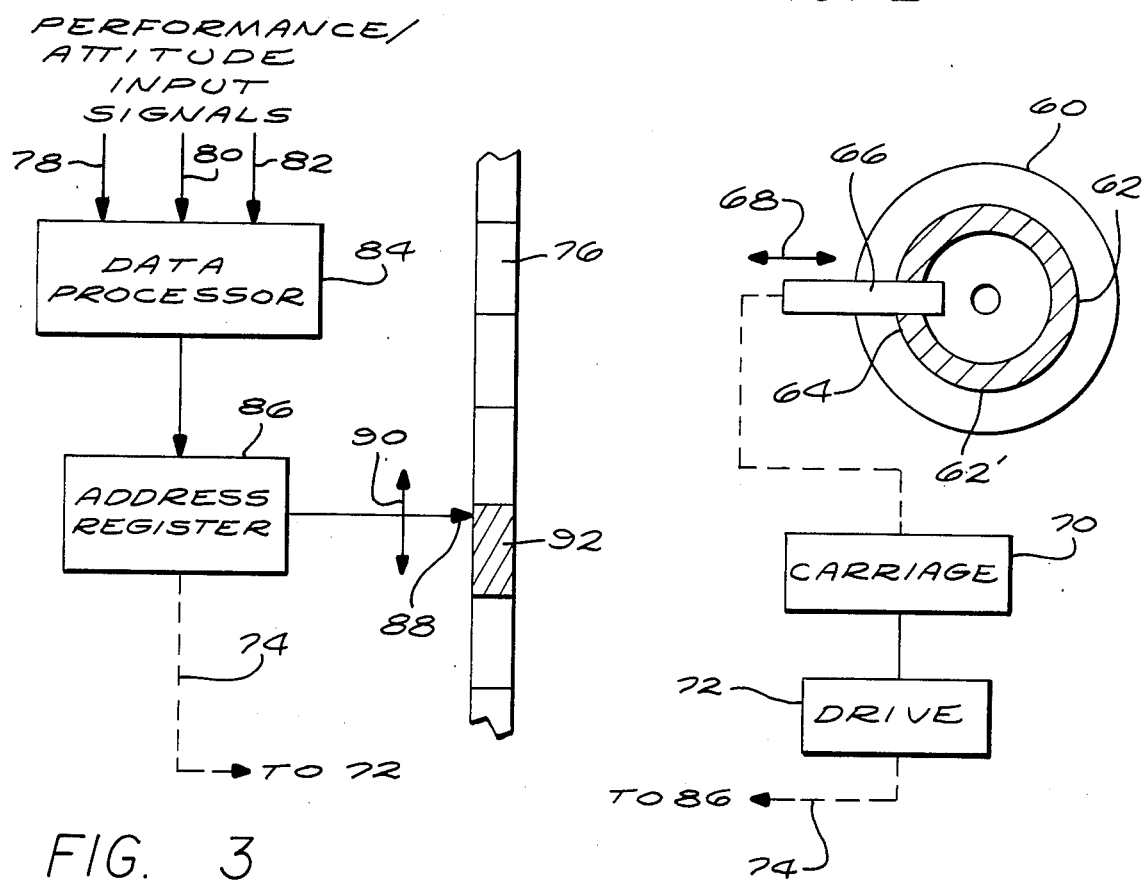
FIG. 2
FIG. 3
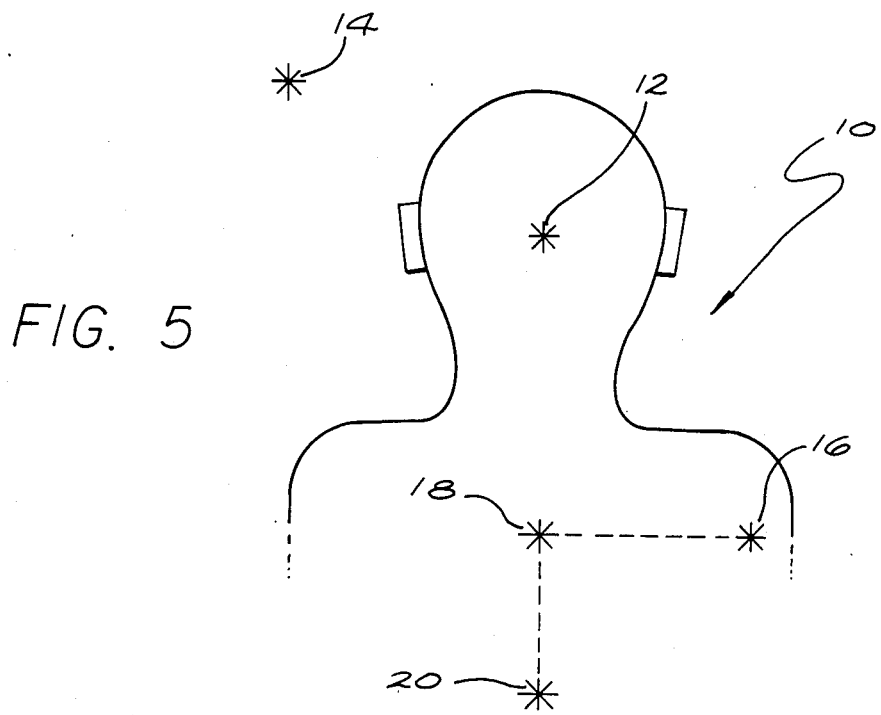
FIG. 5

[4,774,515]

ATTITUDE INDICATOR

BACKGROUND OF THE INVENTION

In many situations it becomes extremely important, sometimes lifesaving, to have available information regarding the individual's position in space. Typically in such circumstances visual signals are provided to the individual which must be interpreted and, if required, appropriate action taken. Specific examples of such situations are operation of an aerospace vehicle, an individual in outer space such as an operator of a manned maneuvering unit, or a diver, such as a deep sea or scuba diver.

It has been the experience of those skilled in the art that when an individual is under extreme stress the visual signals provided are not always seen and when seen are not always interpreted correctly so that the proper action or reaction is taken. When the proper action or reaction is not taken or conversely if the wrong action results from the visual stimulus, disasterous results, including death or destruction of the vehicle can occur.

It has been found that the application of sound to the human being may, in many instances, obtain the attention of the individual even when a visual stimulus will not do so. Attempts to use sound for such purposes are shown in U.S. Pat. Nos. 2,611,810, 3,089,119 and 3,924,262. The systems disclosed assist the operator but in many instances require further interpretation and may confuse more than aid. This is particularly true because the sound is monaural and requires mental processing before decisions can be made and, furthermore, under stress may be easily ignored. To overcome the monaural sound problem attempts have been made to simulate the binaural hearing of an individual, particularly as an aid for blind persons. Such systems, are exemplified by U.S. Pat. Nos. 3,172,075 and 3,366,922. These systems are, however, used to provide range and azimuth information to the user by receiving reflections of previously transmitted acoustic wave energy returned by objects in the blind person's path.

Human beings experience their aural environment in three dimensions, that is, sound made by objects changes tone and intensity as it moves relative to the listener just as a visually perceived object changes in perspective. Thus, through application of a fully three-dimensional aural environment to the individual, the individual may be able to perceive an indication of his attitude with respect to some predetermined norm and, as a result of such unambiguous three-dimensional aural attitude information, be capable of achieving the desired attitude, whether it be a return to the norm or translation to some predetermined desired position.

The aural norm or "level attitude" may be a prerecorded or artificially generated three-dimensional aural signal. This level attitude aural signal may then be rotated by mathematical or electromechanical transformation so as to indicate to the individual any deviation from the level attitude. The amount of rotation which occurs will be proportional to the individual's deviation from the predetermined level attitude.

SUMMARY OF THE INVENTION

An aural attitude indicating apparatus for use by an individual comprising means for providing an aural normal attitude indication to the individual along with means for generating a signal representative of the real time attitude of the individual in space and means for three-dimensional positioning of the aural indication relative to the individual responsive to the real time signal representing the real time attitude to thus provide the individual with an aural indication regarding real time attitude of that individual in space.

BRIEF DESCRIPTION OF THE DRAWINGS

FIG. 2 represents in schematic block diagram one form for providing aural attitude information which has been prerecorded;

FIG. 3 is an alternative embodiment for providing prerecorded aural attitude indications;

FIG. 5 is a schematic diagram illustrating application of the invention to the pilot of an aircraft;

DETAILED DESCRIPTION OF THE INVENTION

Figure 1:
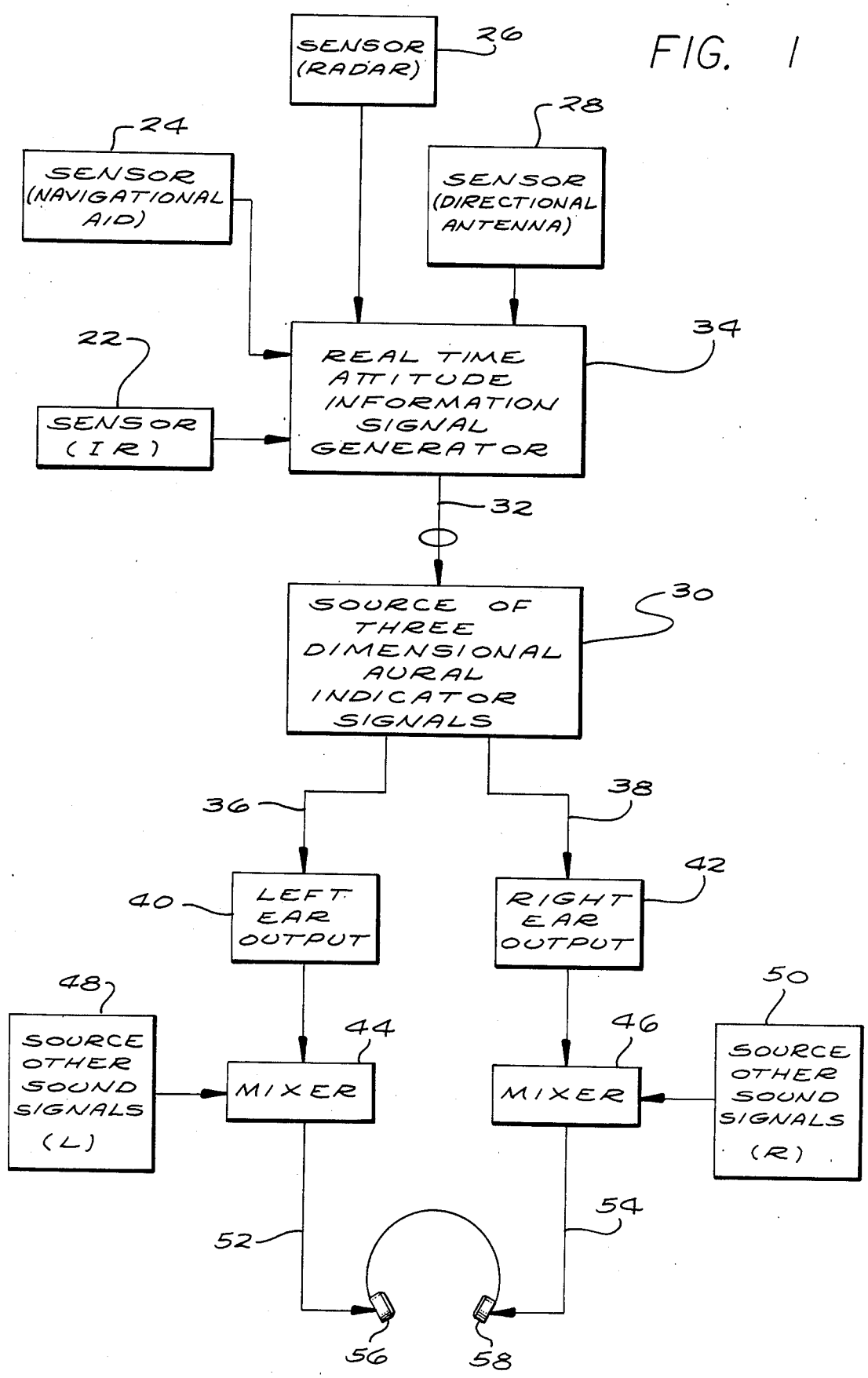
FIG. 1 is a block diagram illustrating apparatus constructed in accordance with the present invention.

In accordance with the principles of the present invention, an individual positioned in space is provided with a three-dimensional signal indicative of his real time attitude relative to a predetermined normal attitude. The three-dimensional aural signal is applied through means of headphones, one situated over each ear of the individual. The aural indications are generated in such a manner that to the user the sound appears to emanate from an external source, that is, one situated outside his own head to thereby provide localization. However, by placing the sound immediately adjacent the user's ears, that is, within the user's "sacred space", urgency may be imparted to the individual as by changing the intensity or frequency of the sound such that the individual cannot ignore the three-dimensional aural signal but must deal with it in a manner to return it toward the predetermined norm Typically, the predetermined norm may be generated in such a manner that, for example, an aural signal is provided which is effectively centered with respect to the individual, that is, both azimuth and elevation of the signal will be effectively straight ahead of the individual. When the real time attitude of the individual changes from this "normal" position of azimuth and elevation being centered, the aural signal changes its position and, for example, intensifies thus indicating to the individual that corrective action should be taken.

As one application of the invention, the remainder of the description will be taken with respect to a pilot in an aircraft. In such an application if the aircraft is flying straight and level the three-dimensional aural indication would appear to be immediately in front and centered with respect to the pilot. It is also contemplated that the pilot may have appropriate controls so that the signal under such circumstances can be minimized or totally eliminated. Under such circumstances the signal would appear to the pilot 10 as emanating effectively straight ahead as shown at 12 in FIG. 5. If the pilot permits the aircraft to enter a descending right turn the three-dimensional aural indicator would be caused to move to a position as illustrated at 14 and to intensify in amplitude thus overriding any preset by the pilot during normal straight and level flight attitude. No interpretation would be needed. The localization achieved through spectral shaping of the sound provides true three-di mensional sound to the pilot. The pilot would know, from the position of the sound, which way to manipulate the aircraft to return the sound to the "normal" position. In the example chosen, the sound coming from above and to the left of the pilot 10 would indicate to the pilot that he must return the wings to level by rotating them to the left and raise the nose of the aircraft to cause the signal 14 to return to its position at 12. Alternatively, should the pilot enter a climbing turn toward the left, the three-dimensional aural indicator would appear, for example, as shown at 16, that is, low and to the right, thus indicating to the pilot that he must return the wings to a level position by rotating them toward the right and lower the nose of the aircraft to bring the sound position 16 back to the position of normal attitude as at 12. If the pilot failed to take all of the corrective action required and, for example, using the last position with the sound at 16 were only to level the wings without lowering the nose of the aircraft, the sound 16 would move to the position as illustrated at 18 indicating that the wings are level but the aircraft would still be in a nose up or climbing attitude. If the pilot continued with the aircraft in that position or, for example, increased the nose up condition until the aircraft was in an impending stall condition the three-dimensional aural indicator would, for example, move to a position as illustrated at 20 and would further intensify in amplitude. The increasing intensity and the positioning of the sound further away from the normal position as indicated at 12 would become so evident to the pilot 10 that corrective action must be taken and the nose of the aircraft would be lowered to decrease the intensity and amplitude of the sound to thereby remove it from the pilot's "sacred space" and to return it to the straight and level position 12.

The intensity and/or frequency of the three-dimensional aural indicator could be modified so that so long as the aircraft is within certain operating parameters the amplitude intensity is maintained relatively low and increases to an intensity requiring immediate attention of the pilot only as these predetermined parameters are exceeded. For example, so long as the aircraft is maintained within standard rate turns, best rate or best angle of climb attitude, proper cruise descent attitude, proper "g" loading, proper air speed and the like, the three-dimensional aural indicator will position itself according to the particular real time attitude of the aircraft but the amplitude will have insufficient intensity to alert the pilot to danger. If, however, any of these parameters are exceeded intentionally or unintentionally, the three-dimensional aural indicator will intensify in amplitude and/or change in frequency to a degree such that the sound will appear to be so closely related to the pilot's immediate environment (within his sacred space) that the pilot must consciously deal with the signal being generated.

The three-dimensional aural indication provided to the pilot may be generated by providing a prerecorded signal carried, for example, on a magnetic disc, tape or stored within a memory of a microprocessor or the like. Appropriate transducers could be coupled to the various aircraft attitude and performance indicators thus providing real time electrical signals indicative of the actual position or condition of the aircraft at any point in time in space. The signals generated by the transducers coupled to these indicators are then utilized to retrieve the stored three-dimensional aural indication from the recorded source thereof for application through appropriate instrumentation to the head set of the pilot. Alternatively a microprocessor or similar data processing unit may be programmed in such a manner that as the signals are generated through the transducers associated with the attitude and performance indicators the microprocessor, through appropriate programming, will generate a three-dimensional aural indicator having the proper spectral shaping indicative of the real time attitude of the aircraft and apply it through the pilot's head phones as above indicated.

Alternatively an individual in space utilizing a manned maneuvering unit or the like may have desired position information transmitted through three-dimensional aural indications from a predetermined source such as a space shuttle or the like thereby directing the individual to a desired position in space with a minimum of effort and fuel consumption.

At the same time the individual to whom the three-dimensional aural position indicating information is being transmitted may also have provided three-dimensional aural signals which are indicative of other elements, both desired and undesired, in his environment. For example, an aural signal can be provided indicative of a threat to the aircraft such as approaching alien aircraft or missiles, low altitude or terrain alerts, navigation aid locations or the like. Such information can be provided in an overlay fashion and in a three-dimensional format simultaneously with the real time attitude information above discussed as well as maintenance of radio communication between the pilot and ground personnel or other pilots.

Various devices and apparatus may be utilized to generate the three-dimensional aural environment for utilization by the pilot or other individual in space and will vary depending upon the particular applications involved.

One example of the utilization of the system for generation of the three-dimensional aural indicator would be to provide the three-dimensional aural indicator in conjunction with a precision approach to landing at an airport. For example, the localizer and glide slope signals of an instrument landing system (ILS) at an airport would provide, through the electrical signal generated by the radio receiver in the aircraft, the desired azimuth and elevation signals for proper control of the aircraft. At the present time visual indicators are provided to aid the pilot in the approach. In accordance with the present invention, the three-dimensional aural signals would also be provided to aurally indicate to the pilot appropriate control correction signals needed to maintain the aircraft on the localizer and on the glide slope. Such three-dimensional signals would be generated by an appropriate microprocessor which would, in response to the signals from the radio receiver in the aircraft, generate aural indicators having the proper spectral shaping to provide to the pilot the localizer and glide slope correction information.

As another example for utilization of the system of the present invention, appropriate sensors would be provided in the aircraft to detect azimuth and/or elevation information of objects outside the aircraft such as other aircraft, missiles or terrain. The sensors may take any form desired such as infra-red detectors, directional antennas, radar signals or the like. The sensor would detect the object and provide an electrical signal indicative of the elevation, azimuth and in some instances range of the object. The thus generated electrical signals would be applied to a microprocessor which would in turn generate the aural indicator having the proper spectral shaping to provide a three-dimensional aural signal to the pilot informing the pilot of the existence of the object. In the event some danger was associated with the object thus detected, the three-dimensional aural indication would invade the pilot's "sacred space", thus making it imperative that the pilot take whatever corrective action is necessary under the circumstances. That is, through invasion of the sacred space the pilot has the traditional fight or flight reaction, particularly if the three-dimensional sound generated is a threatening one, for example, the sound of a rattle snake about to strike.

Through utilization of directional antennas, radio signals such as voice communication emanating from other aircraft, either friendly or unfriendly, or from control towers at airports or the like may also be utilized to provide the desired three-dimensional aural indication, that is, when the directional antenna senses the direction from which the radio transmission emanates an electrical signal representative thereof is provided to a microprocessor which then in turn provides the desired spectral shaping to the voice communication causing it to be received in the ear phones of the pilot in such a manner that its three-dimensional location is provided. If relative position changes between the pilot and the voice communication occurs, the sensor and the microprocessor provide movement of the voice so that the relative position of the transmitter with respect to the pilot changes aurally. Obviously such directional information can be exceedingly important to the operator of the aircraft. Such information may augment or embellish the other information provided to the pilot such as that available on the instrument panel or on the traditional heads up display (HUD) currently in use such, for example, as that described in U.S. Pat. No. 4,305,057.

In any event it will be recognized by those skilled in the art that through utilization of the proper three dimensional aural indications the pilot of an aircraft, or other individual located in inner or outer space, can have provided to him extremely valuable directional "warning" signals which would enable the individual to perform various tasks in a much more efficient and systematic manner than has heretofore been possible. As above indicated the various sensors, signals and aural indications may vary depending upon the particular circumstances encountered and the particular applications involved.

However, by reference to FIG. 1 a generalized block diagram of a system as presently contemplated is illustrated. As is therein shown a source of three-dimensional aural indicator signals 30 is provided. The source 30 may include sound storage devices such as a data disc, an audio disc, a video/audio disc, random access memory, read only memory, bubble memory and/or a digital processor depending upon the particular application involved. Coupled by an appropriate cable 32 to the source 30 is a real time information signal generator 34. The real time information signal generator may include signals generated through transducers coupled to the aircraft attitude and performance indicators, as shown for example in FIG. 4, which will provide information indicative of the real time attitude and/or performance of the aircraft. In addition, the signal generator 34 may provide signals responsive to external stimuli such as the sensors 22 through 28 which are to provide the operator of the aircraft with appropriate information depending upon the particular sensor.

The information signals from the generator 34 then trigger generation of the aural signals by the source 30 with the proper spectral shaping. These three-dimensional aural signals travel through the conductors 36 and 38 to the left and right ear outputs 40 and 42, respectively. These signals are then applied to mixers 44 and 46 which may also receive appropriate sound signals from other sources 48 and 50 for the left and right ear, respectively. Such additional sound sources may be those which would provide an enhancement of the aircraft environment as above-described or to provide non-directional voice communication signals from air traffic control, tower or other aircraft or the like. The thusly mixed signals are applied by way of the leads 52 and 54 to the left and right headphones 56 and 58, respectively. In this manner, the appropriate positioning of the aural indicator signals is accomplished to provide the three-dimensional affect as above-described in conjunction with FIG. 5. The source 30 may take the form of a microprocessor which generates signals which are in turn used to provide the desired spectrally-shaped audio signals or alternatively may take the form of prerecorded audio signals.

To those skilled in the art it will become obvious that prerecorded memories may take various forms upon which, for example, the position data for the aircraft may be stored. For example, the data may be stored on a floppy disc as shown in FIG. 2 at 60. As is known to those skilled in the art the data will be stored in sectors such as shown at 62, 62', 64 and the like. The arm 66 carrying the read/write head may be reciprocated as shown by the arrow 68 by a carriage 70 driven by a carriage drive 72. The drive will receive its signals from an appropriate data processor and address register in response to performance/attitude input signals from the various instruments contained in the aircraft and transducers associated with them as above generally described. Such is illustrated by the dashed line 74. In response to the signals received from the data processor the arm 66 will be positioned, for example, to read the data stored in the sector 64 which would indicate to the pilot that the aircraft is in a specific attitude. That is, the data stored, for example, at sector 64 would be such as to tell the pilot that he must raise the nose of the aircraft and level the wings by rolling to the right. Each time the attitude indicators in the aircraft generate signals indicative of a descending left turn of a predetermined magnitude, both as to roll and pitch, that specific position would be identified causing the head to move to the specific position on the disc 60 to provide the desired three-dimensional aural indication to the pilot.

Obviously the storage media for the prerecorded three-dimensional aural signals may take other forms besides a floppy disc. For example, random access memory or read only memory may be utilized wherein the memory locations within a specific memory such as illustrated schematically at 76, may contain desired digital information which may provide the appropriate spectrally-shaped wave forms to correctly position the aural signal with respect to the pilot as above-described. Again, performance/attitude input signals would be provided as indicated by the leads 78, 80 and 82 to a data processor 84 which would receive the information and apply it to an address register 86 to position the reading apparatus such as illustrated by the arrow 88 in the desired position as indicated by the arrow 90 to read the data stored at the particular position 92 on the media 76. The output information as read, whether as illustrated in FIGS. 2 or 3, is then applied to the aural signal source as shown in FIG. 1 for additional processing and application to the pilot.

Figure 4:
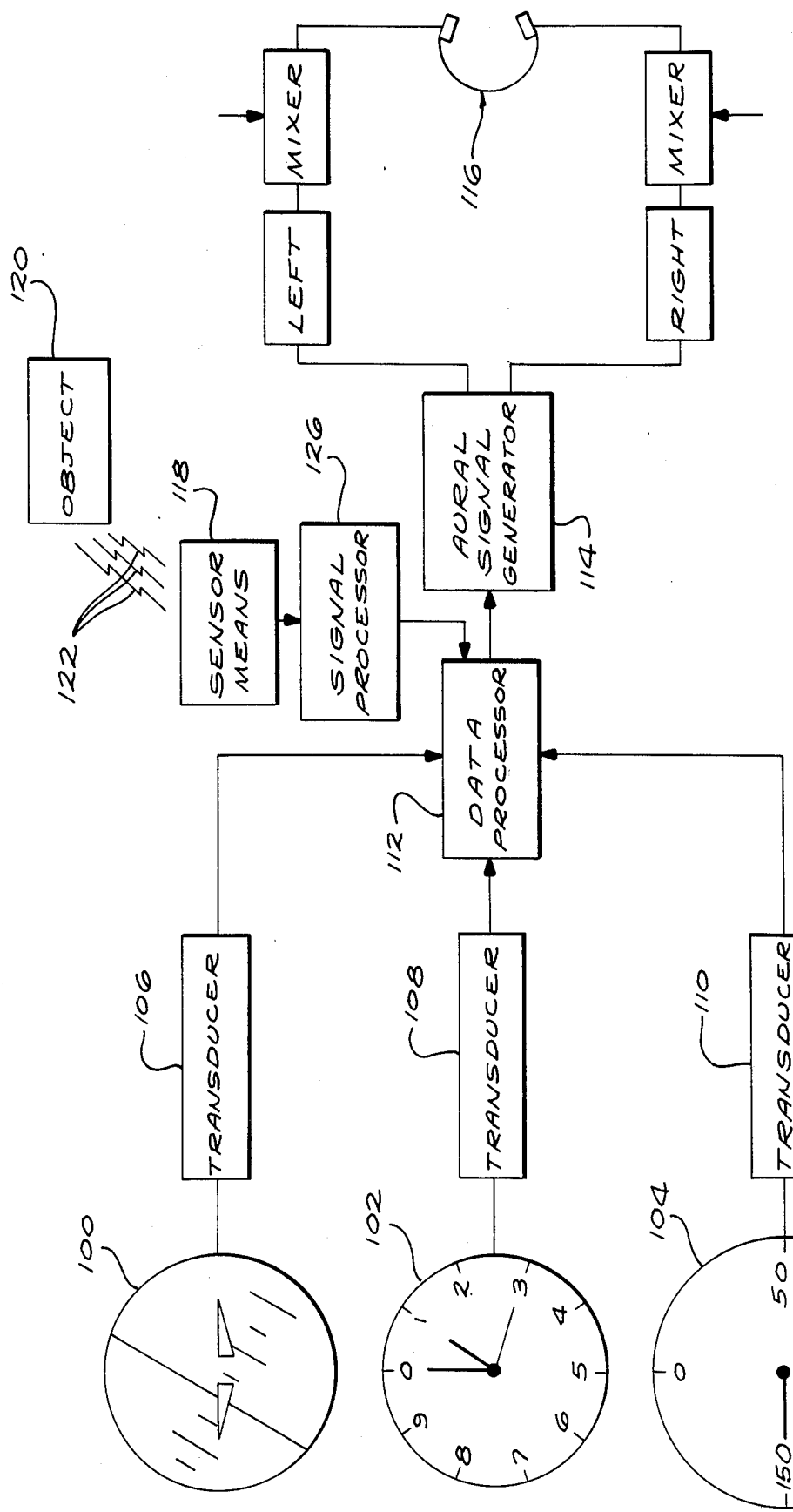
FIG. 4 is a block diagram illustrating generation of attitude information on a real time basis.

By way of further illustration, reference is made to FIG. 4 which illustrates a visual attitude indicator 100, an altimeter 102, and an air speed indicator 104 each of which is connected to an appropriate transducer 106, 108 and 110, respectively. The connections between the specific instruments and the transducers may be mechanical, electrical or electromechanical, as desired. The output from the transducers 106, 108 and 110 would typically be processed, amplified, filtered and otherwise manipulated to be receivable by the data processor in appropriate digital form. The data processor 112 would then further manipulate the data depending upon the program applied to the data processor 112 to generate an aural signal within the aural signal generator 114 which would be indicative of the information received and processed by the data processor 112. This aural signal generator output would be a signal indicative of the attitude of the aircraft as determined from the instruments providing signals to the data processor 112. As before, the output from the aural signal generator would be applied to the headphones 116 to provide in the left and right ear of the pilot the appropriate output signals indicative of the attitude of the aircraft and specifying specific action to be taken by the pilot under the circumstances. For example, with the instruments illustrated the pilot would raise the nose of the aircraft and roll the wings to the left to place the aircraft in a normal position, that is, straight and level flight. As above described, such would be done in the usual even coordinated fashion by the pilot until such a time as the three-dimensional aural signal appearing in the headphones 116 would indicate to the pilot that straight and level flight has been achieved, that is, the signal would appear as illustrated at 12 in FIG. 5.

As has previously been discussed a system such as generally illustrated in FIG. 4 could include sensor means 118 which would be sensitive to an object 120 outside the aircraft and which may, for example, provide signals 122 which would impinge upon the sensor means 118. The signals 122 could take the form of heat signals, radio waves, radar signals or the like, depending upon the particular object 120. The sensor means, in response to receipt of the signals 122 would in turn provide an appropriate output signal to the signal processing apparatus 124 which would operate upon the signal as may be required so that it in turn would be receivable by the data processor 112. The data processor 112 would in turn then activate the aural signal generator to provide an appropriately spectrally shaped three-dimensional signal to be applied to the head phones 116 of the user as above described.

There has thus been disclosed a three-dimensional aural signal indicating apparatus useful in providing information to a person representative of that particular person's position in space with respect to other objects or a particular norm to thus allow the individual to perform appropriate tasks as may be indicated by the three-dimensional aural information.

What is claimed is:

1. Apparatus for providing three-dimensional aural signals to a user comprising:

sensor means for providing a first signal responsive to the existence of a real time predetermined condition;

three-dimensional aural signal generator means for providing an output aural signal to said user, said output aural signal having a spectral shape indicative of a directional location relative to said user of said predetermined condition;

means for applying said first signal to said generator means for activating said generator means to produce said three-dimensional aural signal; and means for applying preselected portions of said three-dimensional aural signal independently to each ear of said user.

2. Apparatus as defined in claim 1 wherein said sensor means includes an infra-red detector.

3. Apparatus as defined in claim 1 wherein said sensor means includes a directional anetenna.

4. Apparatus as defined in claim 1 wherein said sensor means includes a transmitter/receiver.

5. Apparatus as defined in claim 1 wherein said sensor means includes a radio frequency receiver.

6. Apparatus as defined in claim 1 wherein said means for providing said first signal includes an aircraft having at least one performance/attitude instrument and transducer means coupled to said instrument.

7. Apparatus as defined in claim 6 wherein said signal generator means includes means for positioning said aural signal representative of a desired norm for said aircraft and means for varying said spectral shape of said aural signal responsive to changes in said first signal representative of deviations of said aircraft from said norm.

8. Apparatus as defined in claim 7 wherein said signal generator means includes a prerecorded member.

9. Apparatus as defined in claim 8 wherein said desired norm is straight and level flight of said aircraft.

10. Apparatus as defined in claim 9 which further includes means for accessing predetermined portions of said prerecorded member and said means for accessing is responsive to said first signal.

11. Apparatus for providing three-dimensional aural signals to a user comprising:

sensor means for generating a first electrical signal responsive to radiation emanating from an object;

means for generating a real time information signal responsive to said first signal and coupled to said sensor means;

means for providing a three-dimensional aural signal representative of directional location of said object relative to said user and responsive to said real time signal coupled to said means for generating said real time signal;

means for separating said aural signal into left ear and right ear components; and means for applying said components to the respective ears of said user.

12. Apparatus as defined in claim 11 wherein said sensor means includes an infra-red detector.

13. Apparatus as defined in claim 11 wherein said means includes a directional antenna.

14. Apparatus as defined in claim 11 wherein said means includes a transmitter/receiver.

15. Apparatus as defined in claim 11 wherein said means includes a radio frequency receiver.

16. Apparatus as defined in claim 11 wherein said real time information signal includes range of said object relative to said user.

* * * * *